United States Patent [19]
McKee

[11] 3,826,545
[45] July 30, 1974

[54] READILY ASSEMBLED TEMPERATURE COMPENSATED DUAL ANGULAR CONTACT BEARING ASSEMBLY

[75] Inventor: Lewis W. McKee, Brookfield, Conn.
[73] Assignee: The Borden Corporation, Danbury, Conn.
[22] Filed: May 24, 1972
[21] Appl. No.: 256,498

[52] U.S. Cl. ............................ 308/189 R, 308/196
[51] Int. Cl. ............................................. F16c 13/00
[58] Field of Search...... 308/216, 199, 189 A, 189 R

[56] References Cited
UNITED STATES PATENTS

| | | | |
|---|---|---|---|
| 1,210,921 | 1/1917 | Focardi | 308/189 R |
| 1,286,505 | 12/1918 | Beemer | 308/196 |
| 1,926,999 | 9/1933 | Keller | 308/196 |
| 3,492,711 | 2/1970 | Fraunberg | 308/189 R |

FOREIGN PATENTS OR APPLICATIONS

| | | | |
|---|---|---|---|
| 70,310 | 6/1943 | Netherlands | 308/189 R |
| 205,896 | 10/1923 | Great Britain | 308/189 R |
| 894,935 | 5/1943 | France | 308/189 R |
| 895,404 | 1/1945 | France | 308/189 R |

Primary Examiner—Charles J. Myhre
Assistant Examiner—R. H. Lazarus
Attorney, Agent, or Firm—Shenier & O'Connor

[57] ABSTRACT

An assembly of a pair of spaced ball bearings in which axially spaced circumferential grooves formed in a shaft provide spaced inner raceways for receiving sets of balls which are disposed in angular contact raceways of outer rings the raceways of which open axially away from each other and in which a spacer is so constructed as to permit it to be inserted between the outer rings after the bearings are assembled on the shaft and in which the spacer is selected to have a length providing a ball contact angle the tangent of which is the ratio of the diameter of the locus of the ball centers of each set to the axial distance between the ball centers of the sets so that the change in residual clearance of the balls in the raceways tends to be reduced owing to radial expansion of balls and shaft at approximately the rate at which the clearance tends to be increased as a result of axial shaft expansion.

7 Claims, 3 Drawing Figures

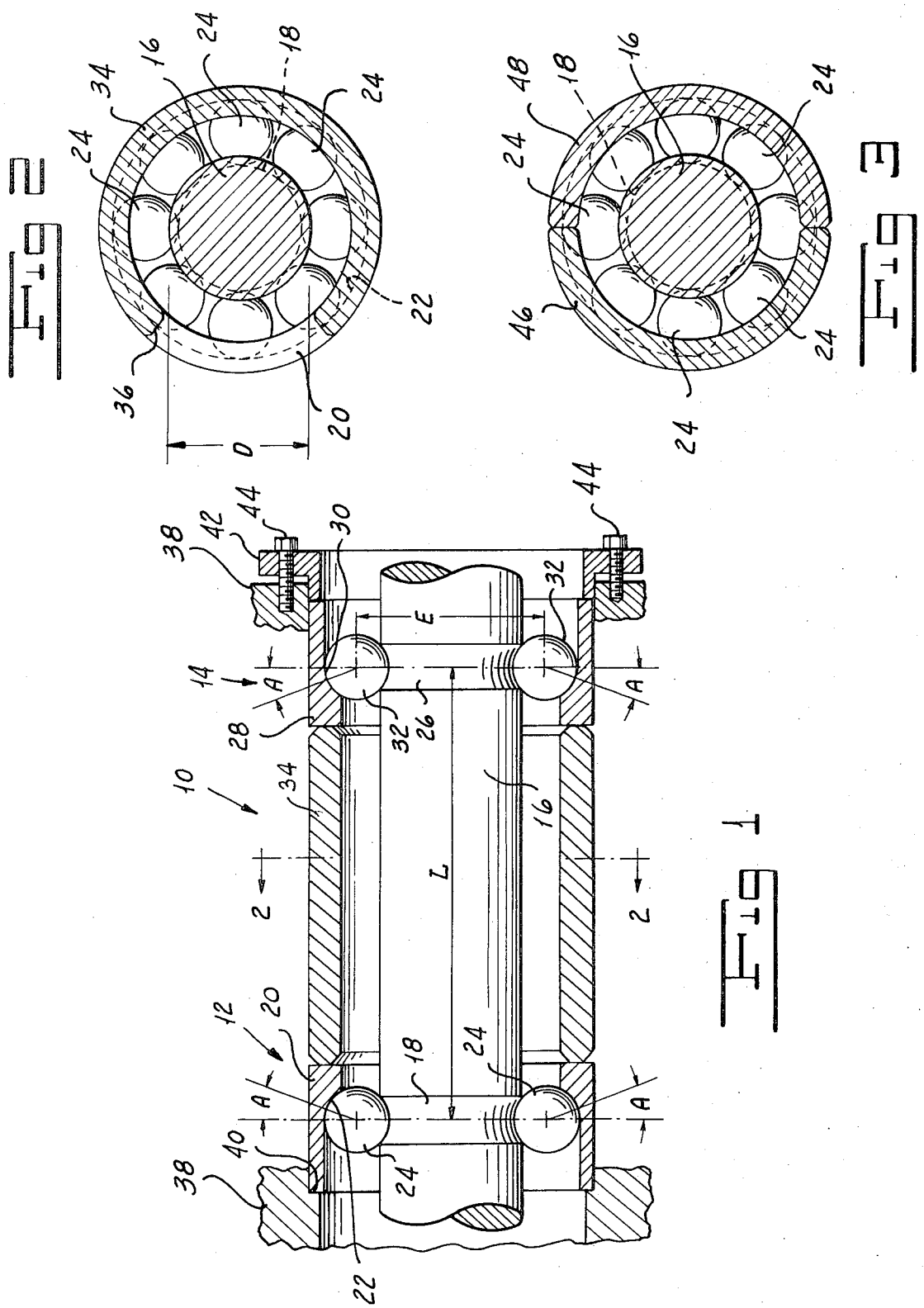

READILY ASSEMBLED TEMPERATURE COMPENSATED DUAL ANGULAR CONTACT BEARING ASSEMBLY

BACKGROUND OF THE INVENTION

There are known in the prior art spaced angular contact bearing assemblies in which the bearings are assembled on a shaft with the use of inner and outer annular spacer sleeves located respectively between the inner rings and between the outer rings. In applying such assemblies to a shaft, one of the bearings first is assembled on the shaft, then the sleeves must be moved axially onto the shaft and the second bearing assembled thereon. The sleeve lengths and the means for securing the bearing rings to the shaft and to the bearing housing are so adjusted as to provide the desired contact angle.

In many instances, it is desirable in a bearing assembly that the inner raceways of a pair of spaced bearings be formed directly in the shaft associated with the bearing assembly. While that is desirable, no-one has heretofore provided an angular contact spaced bearing assembly wherein the inner raceways are formed in the shaft and which can readily be assembled to provide the desired contact angle.

I have invented a spaced angular contact bearing assembly in which the inner raceways are formed in the shaft with which the assembly is associated. My assembly permits the bearings to be applied to the shaft in a rapid and expeditious manner. My construction is such that I may build up the assembly from the inside out. I so arrange my assembly as to provide for compensation for temperature differentials between the shaft and the housing. I am able to provide such compensation in a structure in which the inner raceways are integral with the shaft.

SUMMARY OF THE INVENTION

One object of my invention is to provide a spaced angular contact bearing assembly in which the bearing inner raceways are formed integrally with the shaft.

Another object of my invention is to provide a spaced angular contact bearing assembly which can be built up from the inside out in assembling the bearings on the shaft.

A further object of my invention is to provide a spaced angular contact ball bearing arrangement which is insensitive over a range of temperature differentials between the shaft and the housing in a configuration in which the inner raceways are integrally formed on the shaft.

A still further object of my invention is to provide a temperature-compensated spaced angular contact bearing assembly which is simple in construction for the result achieved thereby.

Other and further objects of my invention will appear from the following description.

In general, my invention contemplates the provision of a temperature-compensated readily assembled angular contact bearing assembly in which a spacer is so constructed as to permit it to be assembled over the shaft between outer rings having angular contact raceways opening away from each other and receiving balls located in spaced grooves formed integrally in the shaft after the balls and rings have been assembled on the shaft and with the ball contact angle having a tangent which is approximately equal to the ratio of the diameter of the locus of the ball centers to the axial distance between centers of the two set of balls.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of one form of my readily assembled temperature-compensated angular contact bearing assembly.

FIG. 2 is a sectional view of the form of my assembly illustrated in FIG. 1 taken along the line 2—2 of FIG. 1.

FIG. 3 is a sectional view of an alternate embodiment of my temperature-compensated readily assembled angular contact spaced bearing assembly.

DESCRIPTION OF THE PREFERRED EMBODIMENT

Referring now to FIGS. 1 and 2, my bearing assembly, indicated generally by the reference character 10, includes respective spaced angular contact bearings indicated generally by the reference characters 12 and 14, which are carried by a shaft 16. The assembly 12 includes an inner raceway 18 which is ground directly into the shaft 16 at the desired location of bearing 12. Bearing 12 includes an outer bearing ring 20 having an angular contact raceway 22, the outer shoulder of which has been removed so that the raceway opens axially outwardly to the left as viewed in FIG. 1. Raceways 18 and 22 receive a plurality of balls 24, which complete the bearing 12.

Bearing 14 is made up of an inner raceway 26 which is provided by a circumferential groove ground directly into the shaft 16 at a location spaced by a predetermined distance from the raceway 18. Bearing 14 has an outer bearing ring 28 provided with an angular contact raceway 30 the outer shoulder of which has been cut away so that raceway 30 opens axially outwardly to the right as viewed in FIG. 1.

In assembling the bearings 12 and 14 on the shaft 16, I first place the balls 24 and 32 and the outer rings 20 and 28 in position. Next, I slip a spacer 34 over the shaft 16 in a radial direction and between outer rings 20 and 28 so that the ends of the spacer engage the ends of the rings 20 and 28 to provide a predetermined ball contact angle A. In the form of my assembly illustrated in FIGS. 1 and 2, spacer 34 is rigid and is generally C-shaped in cross section to form a mouth 36 slightly wider than the diameter of shaft 16 to permit the spacer to be slipped over the shaft in the manner described.

The assembly 10 can be positioned in a bearing housing 38, for example, with ring 20 bearing against a shoulder 40 in the housing and with ring 28 engaged by a retainer ring 42 secured to housing 38 by any suitable means such as by bolts 44.

Referring now to FIG. 3, in an alternate form of my assembly, I make the spacer in two halves 46 and 48 which can be applied over the shaft 16 after the bearings 12 and 14 have been assembled on the shaft. If desired, the two parts 46 and 48 may be bonded together along the parting lines thereof.

I so arrange the parts of my assembly as to afford self-compensation for temperature differences between the shaft 16 and the housing 38. In the arrangement shown, each of the sets of balls 24 and of balls 32 has a locus of centers of rotation which is generally circular and which has a diameter E. Moreover, the axial distance between the locus of the centers of balls 24 and the locus of the center of balls 32 is L. I so select the radial clearance, raceway curvatures and the length of the spacer 34 as to provide a contact angle A the tangent of which is approximately equal to the ratio of E to L. I have discovered that such a contact angle results in self-compensation of the assembly for differences in temperature between the housing and the shaft. Stated otherwise, assumming that the shaft and outer rings and spacer all are of the same material, provision of such a contact angle results in such operation that the radial expansion of the balls and shaft tends to reduce clearance of the balls in the raceways at approximately the same rate that axial shaft expansion tends to increase this clearance. Consequently, there is little or no net change in clearance.

In an installation in which the shaft normally becomes hotter than the housing the limits for the contact angle A which provides self compensation are given by the relationship:

$$A = \tan^{-1} (E/L) \ _{-0°} \ ^{+5°} \quad (1)$$

In an instance in which the housing becomes hotter than the shaft the contact angle limits are given by:

$$A = \tan^{-1} (E/L) \ _{-5°} \ ^{+0°} \quad (2)$$

In use of my assembly on a shaft such as the shaft 16 having integrally formed raceways 18 and 26 the structure may easily be assembled from the inside out. That is, balls 24 and outer ring 20 first are placed in assembled relationship with raceway 18. Then ring 28 and balls 32 are placed in assembled relationship with raceway 26. These operations are carried out in such a manner that the raceways 22 and 30 open outwardly away from each other.

After the bearings 12 and 14 have been assembled in the manner described, in the form of my invention shown in FIGS. 1 and 2 spacer 34 is slipped over the shaft, the width of mouth 36 being such as to permit this operation. The bearings and spacer may then be assembled in the housing 38.

For a given installation I so select the radial clearance, raceway curvatures and the length of spacer 34 as to provide a ball contact angle A the tangent of which is approximately equal to the ratio of E to L. Owing to this relationship the residual clearance between the balls and the raceways tends to be reduced by radial expansion of balls and shaft at approximately the same rate at which it tends to be increased owing to axial expansion of the shaft, thus resulting in little or no net change in clearance.

Use of the form of my invention shown in FIG. 3 in which the spacer is formed in two parts 46 and 48 is substantially the same as that of the form of the invention shown in FIGS. 1 and 2.

It will be seen that I have accomplished the objects of my invention. I have provided a spaced angular contact bearing assembly having inner raceways integrally formed in the shaft of the assembly, the structure of my assembly may be readily assembled from the inside out. My assembly is insensitive to temperature differentials between the shaft and the housing. It is simple in construction for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A spaced bearing assembly including in combination, a shaft formed with a pair of axially spaced circumferential grooves providing inner bearing raceways, a pair of outer bearing rings formed with outer raceways surrounding said shaft at locations at which said inner and outer raceways form pairs of cooperating raceways, respective sets of rolling elements located in the raceways of said cooperating pairs, and a rigid spacer over said shaft between said outer rings, said spacer being constructed to permit its assembly over said shaft between said rings after assembly of said outer rings and said rolling elements on said shaft, each set of said rolling elements having a circular locus of centers of rotation of said rolling elements, the radial clearance of said rolling elements in said raceways and the curvature of said raceways and the axial length of said spacer being such as to provide a bearing contact angle having a tangent approximately equal to the ratio of the diameter of said locus to the axial distance between the locus of one set of elements and the locus of the other set of elements said axial distance being greater than said diameter.

2. An assembly as in claim 1 in which said spacer has a generally C-shaped cross section with a mouth, said mouth having a dimension greater than the diameter of said shaft to permit said spacer to be slipped over said shaft between said outer rings.

3. An assembly as in claim 1 in which said spacer is a generally annular two-part assembly adapted to be assembled between said outer rings after said rings and said elements have been assembled on said shaft.

4. A spaced bearing assembly including in combination, a shaft formed with a pair of axially spaced circumferential grooves providing inner bearing raceways, a pair of generally cylindrical outer bearing rings having planar inner end faces surrounding said shaft at locations adjacent said inner raceways, said outer bearing rings being formed with axially outwardly opening angular contact raceways cooperating respectively with said inner raceways to form pairs of cooperating raceways, respective sets of balls disposed in the raceways of said pairs, and a rigid generally cylindrical spacer over said shaft between said outer rings, said spacer having end faces respectively engaging said outer ring end faces in the region of said balls, the construction of said spacer being such as to permit it to be assembled over said shaft between said rings after assembly of the balls and rings on said shaft, each set of said rolling elements having a circular locus of centers of rotation of said rolling elements, the radial clearance of said rolling elements in said raceways and the curvature of said receways and the axial length of said spacer being such as to provide a bearing contact angle having a tangent approximately equal to the ratio of the diameter of said locus to the axial distance between the locus of one set of elements and the locus of the other set of elements said axial distance being greater than said diameter.

5. A bearing assembly as in claim 4 in which said spacer has a generally C-shaped cross section forming a mouth slightly wider than the diameter of said shaft to permit said spacer to be slipped over said shaft.

6. A bearing assembly as in claim 4 in which said spacer is a generally annular two part assembly adapted to be assembled between said rings after assembly of said rings on said shaft.

7. An assembly as in claim 4 in which each of said sets of balls has a circular locus of centers of rotation of the balls of the set and in which the radial clearance of said balls in said raceways and the curvatures of said raceways and the axial extent of said spacer is such as to provide a ball contact angle having a tangent which is approximately equal to the ratio of the diameter of said locus to the axial distance from the locus of one set to the locus of the other set.

* * * * *

UNITED STATES PATENT OFFICE
CERTIFICATE OF CORRECTION

Patent No. 3,826,545          Dated July 30, 1974

Inventor(s) Lewis W. McKee

It is certified that error appears in the above-identified patent and that said Letters Patent are hereby corrected as shown below:

Title Page, under "[73]" Assignee: "Borden" should read -- Barden --.

Signed and sealed this 8th day of October 1974.

(SEAL)
Attest:

McCOY M. GIBSON JR.              C. MARSHALL DANN
Attesting Officer                Commissioner of Patents